G. F. OLISH.
NUT LOCK.
APPLICATION FILED SEPT. 18, 1915.

1,272,988.

Patented July 16, 1918.

Witnesses
Wm. H. Mulligan.
B. F. Garvey Jr.

Inventor
George F. Olish
By Richard B. Owen,
Attorney

UNITED STATES PATENT OFFICE.

GEORGE F. OLISH, OF MINNEAPOLIS, MINNESOTA; PETER S. OLISH EXECUTOR OF SAID GEORGE F. OLISH, DECEASED.

NUT-LOCK.

1,272,988.

Specification of Letters Patent.    Patented July 16, 1918.

Application filed September 18, 1915. Serial No. 51,364.

*To all whom it may concern:*

Be it known that I, GEORGE F. OLISH, a citizen of the United States, residing at Minneapolis, in the county of Hennepin and State of Minnesota, have invented certain new and useful Improvements in Nut-Locks, of which the following is a specification.

This invention relates to nut locks and has for its primary object to provide a device of this character which will allow for the free rotation of the nut on the bolt and at the same time will prevent the unthreading of the nut from the bolt unless power is applied thereto.

Another object of this invention is to equip one of the members with a locking element which is adapted for frictional engagement with the opposite member so as to securely bind the same and prevent the unthreading of the nut from the bolt, due to vibration or the like.

A further object of the invention is to provide a device especially applicable on railways or the like where a certain amount of vibration is due from the rolling stock passing over the rails and is equipped with a locking element which is situated on the interior of the nut so as to keep the same from view, thereby preventing train wreckers or the like from "picking" the locking element and allowing the meeting ends of the rail to separate for throwing the train from the track.

Other objects as well as the nature, characteristic features and scope of my invention will be more readily understood from the following description taken in connection with the accompanying drawings and pointed out in the claim forming a part of this specification.

Referring to the drawings:—

Figure 1:
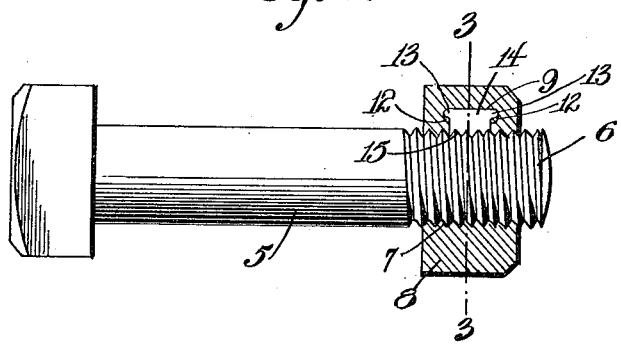
Figure 1 is a side elevation of the bolt showing my improved locking nut in section thereon.
Figure 2:
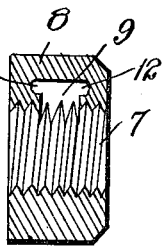
Fig. 2 is a sectional view of the nut showing the locking element in space therein.
Figure 3:
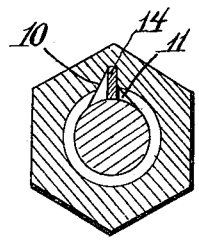
Fig. 3 is a cross sectional view taken on the line 3—3 of Fig. 1.
Figure 4:
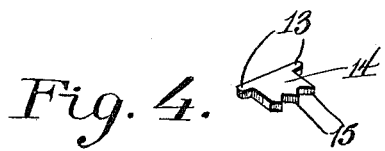
Fig. 4 is a detail perspective view of the locking element.

In the drawings wherein is shown the preferred form of my invention the numeral 5 represents a bolt which is provided with an ordinary externally screw threaded shank 6, which is adapted for engagement with the interior threaded bore 7 of the nut 8. The nut 8 is of the usual form except for the chamber or recess 9 which is positioned on the interior thereof and is provided with a releasing space 10 which communicates therewith. The recess 9 extends from approximately the center of the nut inwardly and through the bore as shown to advantage in Fig. 3. As before stated the one side of the recess is provided with a releasing space 10 and the opposite side provided with a slightly cut-out portion 11 which is formed in the threaded bore of the nut.

The recess 9 is further provided with bearing recesses 12 which are adapted to receive the pintles 13 which are formed on the key 14. The key 14 is mounted in the chamber 9 and is held from movement in one direction therein, in view of the cut-out portion or releasing space 10. It is therefore obvious that the nut is free to rotate in one direction. The key 14 has a plurality of teeth 15 formed on the one edge thereof which straddle the thread 6 of the bolt 5.

In use the nut 8 is threaded on the bolt 5 to the desired point, the key 14 riding freely over the thread 6 of the bolt 5, as the teeth 15 of the locking key 14 correspond to the thread 6 on the bolt and thereby allows for the free rotation of the nut on the same. When it is desired to remove the nut from the bolt it is necessary to apply power thereto through the medium of a wrench or similar tool, so as to throw the teeth 15 of the locking key at right angles to the body thereof and into the recess 11 which is formed for this purpose. It will be readily seen that as soon as the nut has been turned for approximately one revolution on the bolt the teeth 16 will have been turned into the recess or cut-out portion 11 so as to allow for the free rotation or unthreading of the nut from the bolt without mutilating the threads of either.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my inven- tion, what I claim as new and desire to secure by Letters Patent is:—

In combination with a nut and bolt, said nut having a recess therein opening through the bore of the nut, a key mounted in the recess and extending into the bore of the nut for engagement with the bolt, one wall of the recess being at an angle to a plane passing through the axis of the nut and the bottom of the recess, the opposite wall being parallel to said plane, and merging into a wall arranged at an opposite angle to said plane.

In testimony whereof I affix my signature in presence of two witnesses.

GEORGE F. OLISH.

Witnesses:
GEO. L. TELLER,
LOU O. BURKE.

Copies of this patent may be obtained for five cents each, by addressing the "Commissioner of Patents, Washington, D. C."